Figure 1:
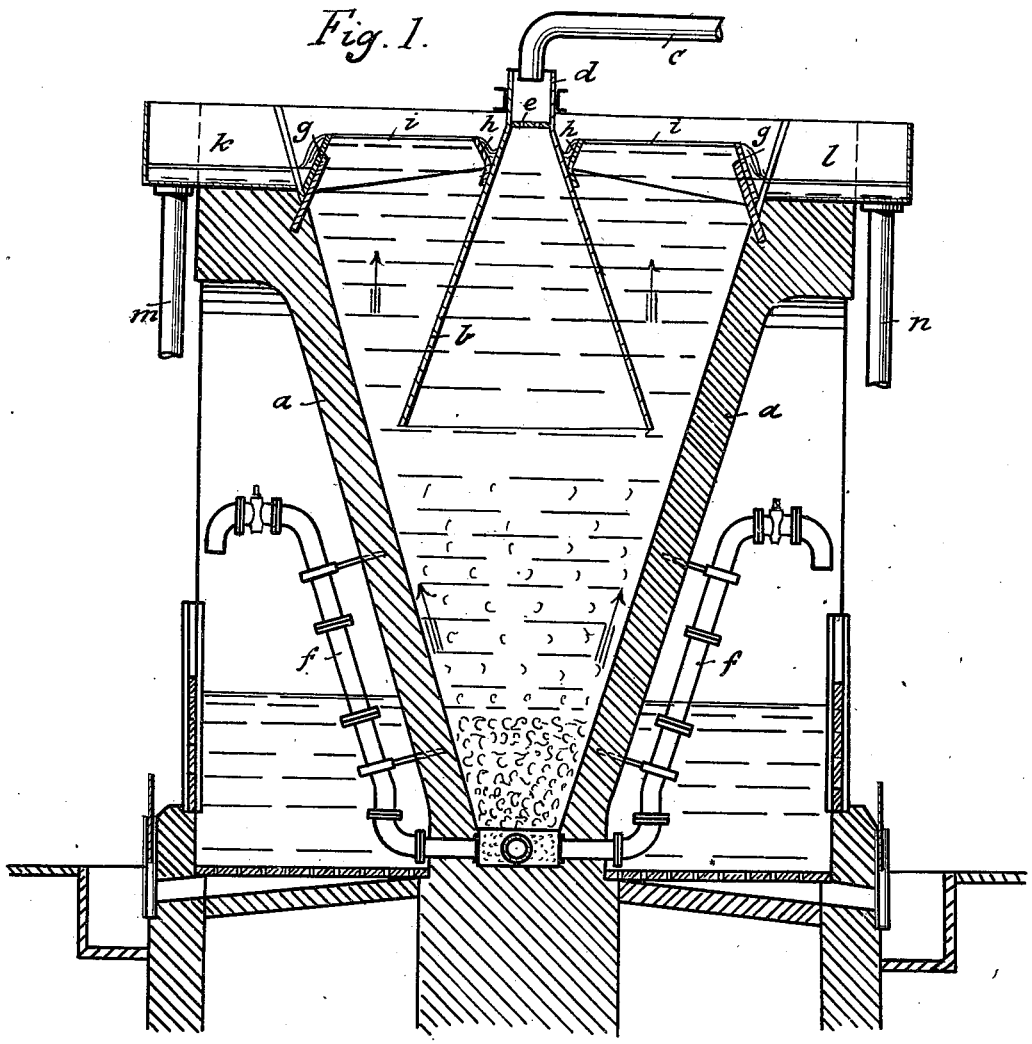

No. 668,559. Patented Feb. 19, 1901.
E. FÜLLNER.
APPARATUS FOR COLLECTING PULP FROM WASTE WATERS OF PAPER WORKS.
(Application filed Nov. 8, 1900.)
(No Model.) 2 Sheets—Sheet 1.

WITNESSES
Ella L. Giles
Otto Munk

INVENTOR
Eugen Füllner
BY
Richards & Co.
ATTORNEYS

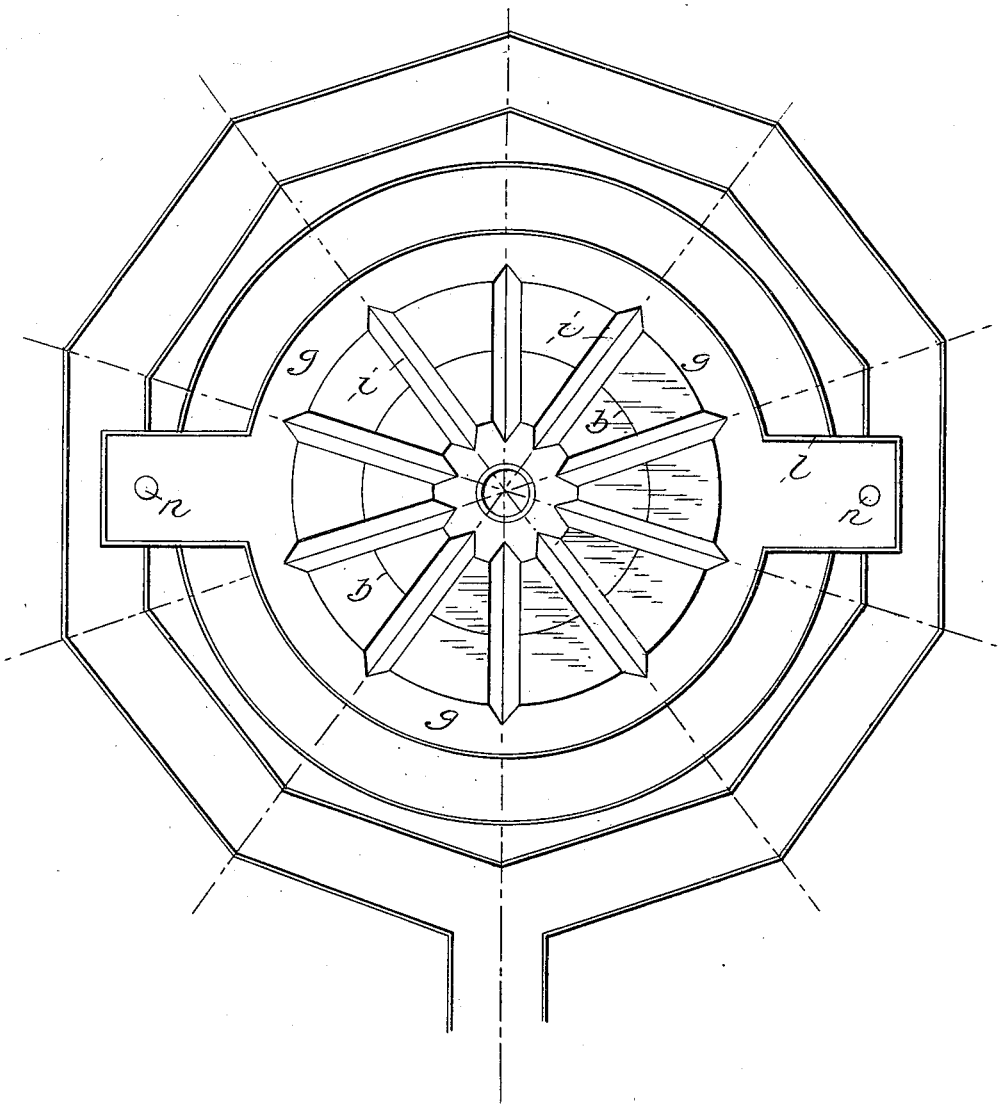

UNITED STATES PATENT OFFICE.

EUGEN FÜLLNER, OF WARMBRUNN, GERMANY.

APPARATUS FOR COLLECTING PULP FROM WASTE WATERS OF PAPER-WORKS.

SPECIFICATION forming part of Letters Patent No. 668,559, dated February 19, 1901.

Application filed November 8, 1900. Serial No. 35,888. (No model.)

*To all whom it may concern:*

Be it known that I, EUGEN FÜLLNER, of Warmbrunn, Silesia, German Empire, have invented certain new and useful Improvements in Apparatus for Collecting Pulp from Waste Waters of Paper-Works, of which the following is a specification.

My invention has reference to funnel-shaped pulp-collectors; and its object is to collect the material fibers contained in the waste waters of paper and cellulose works more certainly than it can be done with the fiber-collectors at present known.

The invention more particularly consists in a central inlet being arranged in the collector, which inlet has a funnel shape in the reverse direction to the funnel shape of the collector. By this means an important technical improvement for the separation of fibers is obtained—viz., that the inflowing water first passes into a chamber the section of which constantly increases, which has of course for a consequence that in contrast the speed of the stream descending in this chamber diminishes to an extent corresponding to the increase of the section or width of the chamber.

The invention further consists in a star-shaped system of channels arranged around the central inlet, by which channels the purified water is collected in such manner that any irregular flow of the water rising in the upper funnel-shaped annular space is avoided. This regular ascension of the water, in conjunction with the greatly-increased retardation of the flow of the water in this annular space, has the action of separating out any fibers carried with the water into this space.

A form of construction of this collector with a central inverted-cone-shaped and with a star-shaped system of overflow-channels is shown in the accompanying drawings, in which—

Figure 1 is a vertical section of same, and Fig. 2 a plan view.

The cone-shaped depositing vessel $a$ is in the present case made of masonry; but of course it may be made of iron or wood. In the vertical central axis of the hopper there is a reversed conical inlet $b$. The supply-pipe $c$ for the water to be purified opens into a cylindrical neck $d$ of the inlet-funnel and is separated therefrom by a sieve $e$, which retains the coarser impurities, while the fibers carried with the water pass through the sieve.

In the downwardly-widening funnel $b$, owing to the constant increase of section, a delay in the flow of the descending water takes place to a corresponding extent. The consequence of this is that the fibers, which have always a somewhat greater specific gravity, and consequently possess by reason of the original speed of inflow a greater impetus, fall in an ever-slackening stream down to the lower edge of the funnel and descend into the part of the deposit-hopper $a$ situated beneath it. This descent of the fibers proceeds the more unimpededly as the upwardly-directed flow of the water is forced by the inlet-funnel toward the wall of the depositing-hopper, the consequence of which is that an almost currentless column of water is formed in the center of the depositing-hopper and beneath the inlet-funnel, into which column the fibers (which of course are mainly delivered from the center of the inlet-cone) arrive in order to sink without further interruption into the point of the hopper. The farther the fibers descend into the deposition vessel the stronger is the mutual agglomeration of the fibers produced by the always-narrowing shape of the hopper, and thereby an always greater accumulation of the same is caused, so that a comparatively dense mass of fibers accumulates in the point of the hopper, which mass, by the pressure of the water column above it, is forced in the usual way into a discharge-pipe $f$ and through this conveyed into a suitable collecting vessel. The water descending in the inlet-funnel $b$, and thus always spreading out, assumes first a course directed toward the wall of the depositing or separating hopper $a$ and then rises along the wall of the funnel, in the upper part of which is arranged the star-shaped system of channels, which carry off the purified water in such a way that any stronger flow of the rising water to one or more given points of the annular space is avoided, and thus the rise of the water in said annular space can take place quietly and evenly. For this object a channel $g$ is provided along the upper edge of the collecting-hopper and another, $h$, around the upper edge of the inlet-funnel b, and these two channels are connected with one another by a large number of channels i—in the present instance ten in number. (See Fig. 2.) The channels are open above, are of V-section, and lie with their overflow edges at the level of the sieve e. The channels i have a fall from the channel h around the inlet-funnel to the outer channel g. The purified water flows out of the same into the two collecting-channels k l, arranged diametrically opposite one another, from which it is discharged through down-pipes m and n.

The avoidance of any irregular flow of the water rising in the upper funnel-shaped annular space between the wall of a and the exterior of funnel b by means of the hereinbefore-described method of catching it by means of the extended series of gutters in conjunction with the greatly-increased retardation of the flow of the water has the action of precipitating or separating out any fibers carried with the water into this space and accumulating same on the two funnel-shaped walls of this space to a sufficient height of accumulation. The portion of the water immediately adjoining the lower edge of the inlet-hopper b is of course engaged by this current proceeding upward between the edge of the funnel b and the opposite wall of the collecting-hopper. The descending portions of the water more toward the center of the inlet-funnel b proceed to a certain extent first somewhat farther down and then turn against the walls of the depositing-hopper, and finally also flow upward along the said walls. The annular aperture between the lower edge of the inlet-funnel and the wall of the collecting-hopper is preferably so calculated that an acceleration in the upwardly-directed flow of water is also avoided at this place. It is necessary for this purpose to make the aperture so large that its total section is as large as the under opening of the inlet-funnel b. Above the said annular aperture the water passes into the tapering annular space between the inlet-funnel and the upper part of the collecting-hopper, in which space it rises upward with an extraordinary retardation in its speed of flow.

What I claim, and desire to secure by Letters Patent, is—

1. In an apparatus for collecting pulp, in combination, a hopper of inverted conical shape, an inlet-funnel of conical shape depending into said hopper axially thereof, the base of said funnel forming with the wall of the hopper a contracted annular passage centrally of the hopper, a free space converging to a contracted discharge for the precipitate being formed below said funnel and a free space being provided above said passage between the exterior of the funnel and the reversely-extending wall of the hopper, substantially as described.

2. In apparatus for collecting pulp from the waste waters of paper-works, the combination with a funnel-shaped hopper a and a central inverted-funnel-shaped inlet b of a system of annular and radial channels g, h, i arranged in the upper part of the hopper around the inlet-funnel, substantially as and for the purpose set forth.

In witness whereof I have hereunto set my hand in presence of two witnesses.

EUGEN FÜLLNER.

Witnesses:
 EMIL F. HOFFMANN,
 WOLDEMAR HAUPT.